Patented Sept. 18, 1923.

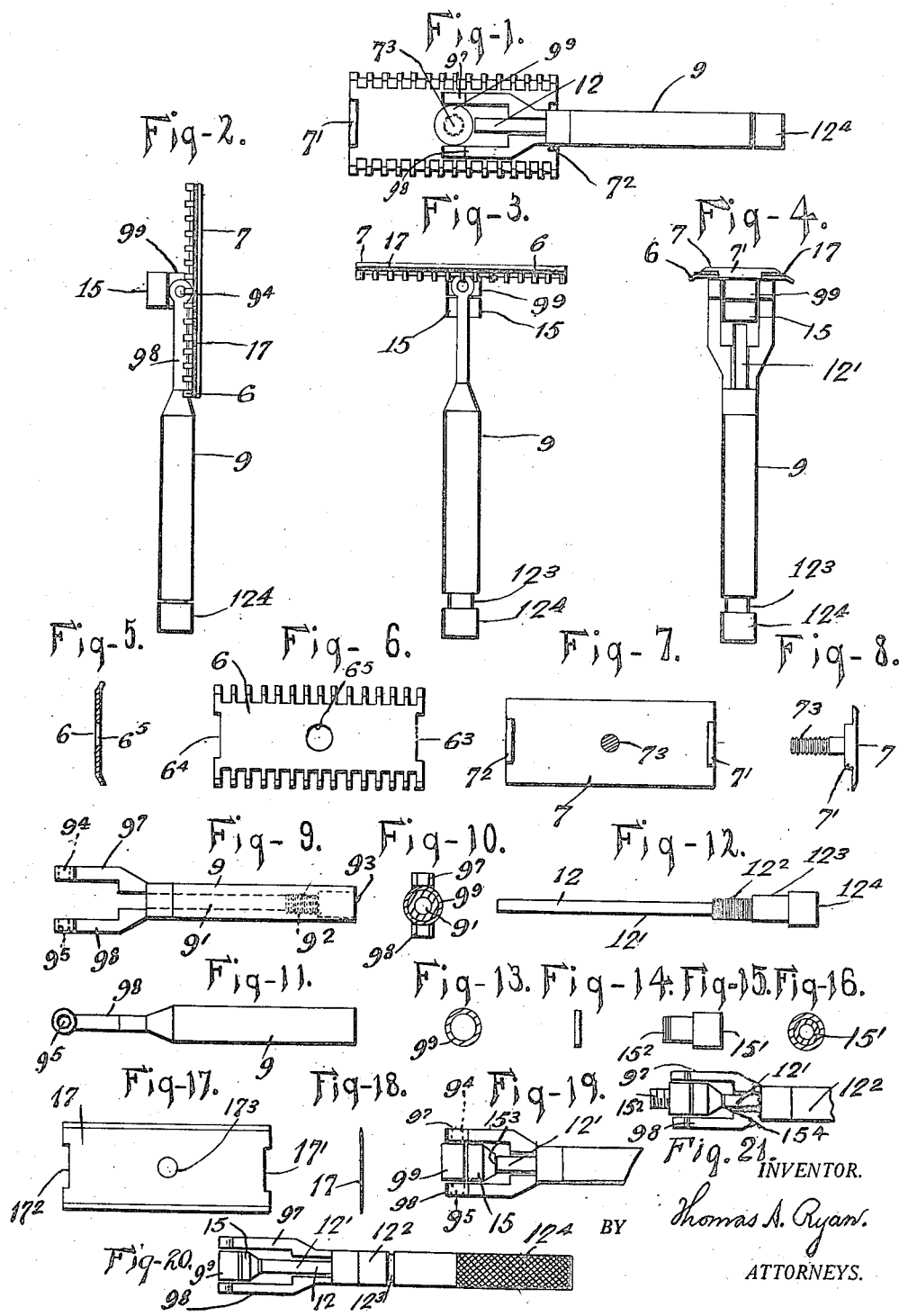

1,468,082

UNITED STATES PATENT OFFICE.

THOMAS A. RYAN, OF YONKERS, NEW YORK.

SAFETY RAZOR.

Application filed December 10, 1919. Serial No. 343,860.

*To all whom it may concern:*

Be it known that I, THOMAS A. RYAN, a citizen of the United States, residing in the city of Yonkers, county of Westchester, State of New York, have invented a new and useful Improvement in Safety Razors, of which the following is a description in this specification and the accompanying drawings.

By a construction and combination of parts, I produce a razor handle that can be attached to any blade holder having threaded means adapted to attach to a blade holder.

This invention provides means whereby the handle can be screwed to a blade holder stud, and the blade adjustably clamped to the blade holder, and the handle locked in a straight or angular position with relation to the blade holder, thus affording means whereby any blade holder having threaded means can be attached to this handle, and may be provided with this new and useful improvement.

The handle will be further disclosed in the accompanying drawings, in which the handle is shown attached to a blade holder.

Fig. 1 is a plan view. Fig. 2 is an elevation showing the handle and blade holder in parallel positions. Fig. 3 is a front elevation of the razor. Fig. 4 is a side elevation. Fig. 5 is a transverse section of the guard. Fig. 6 is a plan view of the blade guard, and has opposed spaced teeth $6^1$, and end recesses $6^3$ and $6^4$, and its center formed into a hole $6^5$, and a slightly enlarged portion $6^6$. Fig. 7 is a plan view of the clamping plate. Fig. 8 is a transverse view of the clamping plate. Fig. 9 is a plan view of the handle. Fig. 10 is a transverse view of the handle. Fig. 11 is a longitudinal transverse view of the handle. Fig. 12 is a plan view of the locking rod. Fig. 13 is an elevation of the handle showing a male thread of the swivel 18. Figs. 14 and 15 are elevations of same. Fig. 16 is a transverse view of the same. Fig. 17 is a plan view of the blade. Fig. 18. is a transverse view of the same. Fig. 19. is a plan view showing the complete handle head with part of the handle broken away. Fig. 20 is a plan view of the complete handle. Fig. 21 is a view showing the end of handle, arms, collar, and a member having a male thread at one end, and its other end formed into a female thread. This member can also be formed with a male thread at one end and its outer face formed for a bearing for the handle.

The blade guard Fig. 6, has spaced teeth $6^1$, $6^2$, longitudinally and recesses $6^3$, $6^4$, and a center hole $6^5$. The handle 9 has a longitudinal hole $9^1$ having a threaded section $9^2$, and an enlarged section $9^3$, and holes $9^4$ and $9^5$ in the arms $9^7$ and $9^8$, which are pivoted to the rotary collar $9^9$ in which is held the nut 15, having a thread $15^2$ and its outer end $15^4$ formed to offer a bearing for the end of the locking rod 12 when the handle is locked in a straight or an angular position, the sections $12^1$ and $12^3$ of the locking rod turn in sections $9^1$ and $9^3$, and the thread $12^2$ turns in the thread $9^2$ and the locking rod is manipulated by the end $12^4$. The handle can be readily connected or disconnected from a blade holder by turning the nut 15, which has threaded means to attach to the blade holder. The nut 15 clamps the collar $9^9$ in the desired position in relation to the blade holder, and screwing the end of the locking rod 12 against the periphery of the nut 15 or the collar $9^9$, locks the handle in the desired position in relation to the blade holder.

Having thus described my invention, what I claim as new is:—

1. The combination in a safety razor, of a removable handle for a blade holder comprising opposed arms pivoted to a collar, said collar supporting a rotatable member, said rotatable member having threaded means to attach to a blade holder and means to operatively engage a locking rod, said locking rod having a knurled end and a threaded section adapted to co-operate with a threaded section in a longitudinal hole in said handle, with means to lock said handle in any desired angle with said blade holder.

2. The combination in a safety razor, of a blade holder comprising a front plate having opposed end lugs and a threaded stud, a blade having a center hole and opposed end recesses, a blade guard having longitudinally opposed spaced teeth a center hole and opposed end recesses, with means to clamp said blade between said plate and guard by attaching to threaded means rotatably mounted in a collar pivoted between arms of a handle, said handle having a longitudinal hole with a threaded section engaged by a threaded section of a locking rod having a knurled end, and adapted to engage means to lock said handle in any desired position in relation to said blade holder.

3. The combination in a safety razor, of a handle adapted to be removably attached to a blade holder, comprising female threaded means rotatably mounted in a collar, said collar pivoted between arms of a handle, said handle having a longitudinal hole with a threaded section operatively engaged by a threaded section of a locking rod having a knurled end, with means to lock said handle in any desired angle with said blade holder.

4. The combination in a safety razor, of a handle adapted to be removably attached to a blade holder, comprising male threaded means rotatably mounted in a collar pivoted between the arms of a handle having a longitudinal hole with a threaded section operatively engaged by a threaded section of a locking-rod having a knurled end, with means to lock said handle rigid at any desired angle to said blade holder.

5. The combination in a safety razor, of a handle adapted to be removably attached to a blade holder, comprising a male and female threaded member rotatably mounted in a collar, said collar pivoted between the arms of a handle having a longitudinal hole with a threaded section operatively engaged by a threaded section of a locking rod having a knurled end, with means to lock said handle angled to said blade holder.

In testimony whereof I affix my signature in the presence of two witnesses.

THOMAS A. RYAN.

Witnesses:
WILLIAM J. LEACH,
GEO. STEARNS COWLES.